Patented Sept. 7, 1926.

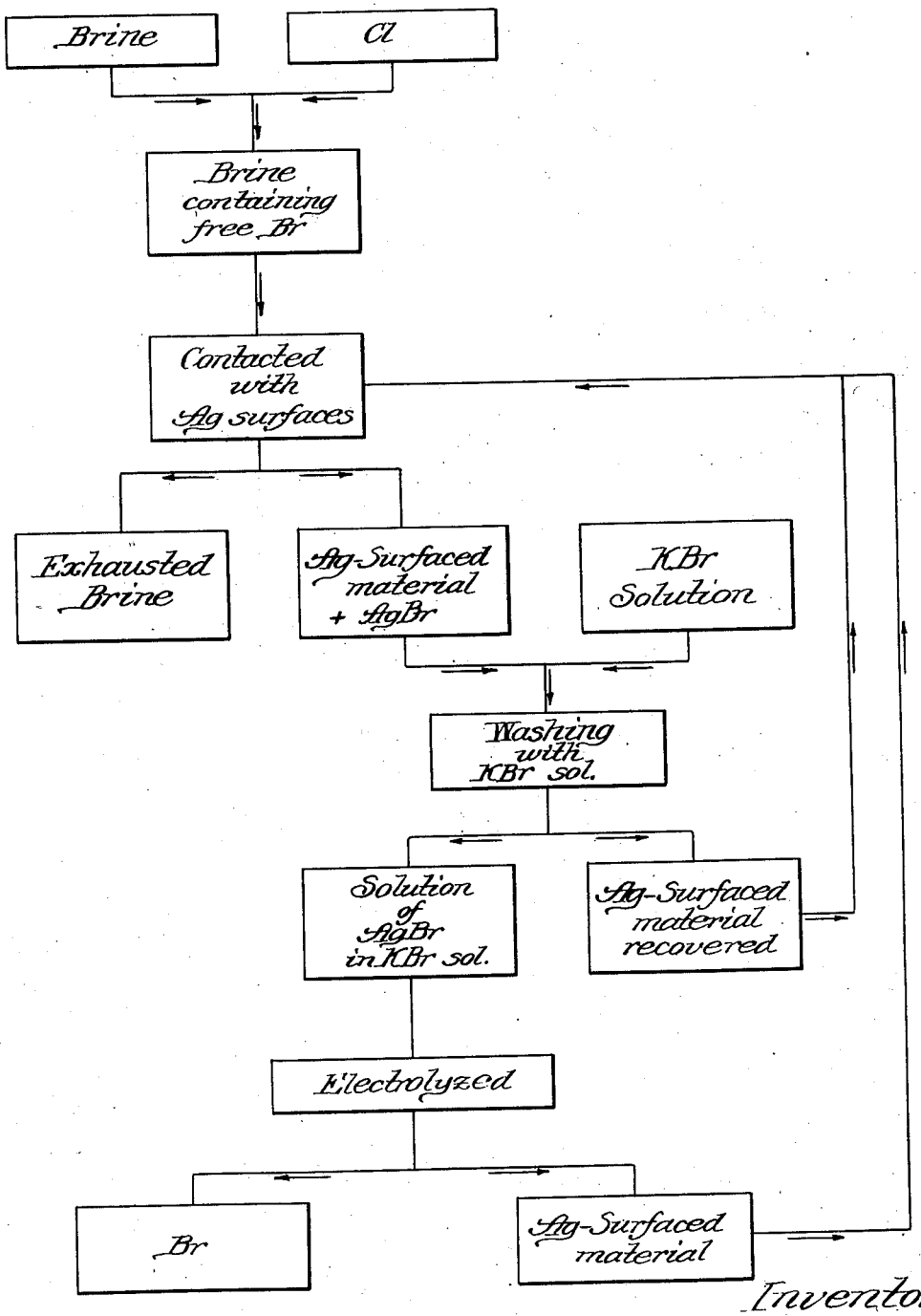

1,599,108

UNITED STATES PATENT OFFICE.

ROBERT E. WILSON, OF CHICAGO, ILLINOIS, ASSIGNOR TO STANDARD OIL COMPANY, OF WHITING, INDIANA, A CORPORATION OF INDIANA.

PRODUCTION OF BROMINE.

Application filed November 24, 1924. Serial No. 752,063.

The present invention relates to improvements in methods for the production of bromine from solutions or brines containing its compounds in small proportions; for example, sea water, which has an approximate bromine content of 0.072 grams per liter.

The accompanying drawing illustrates a flow sheet of the preferred method of carrying out the invention.

In carrying out the invention, the brine from which the product is to be manufactured is first treated with chlorine, the quantity employed being a slight excess above the equivalent of the bromine present in the brine. Thus, the chlorine required may be produced by a sufficient electrolysis of all or a part of the brine treated, in the latter case the electrolyzed brine being mixed with the remainder. The chlorinated brine is then passed over metallic silver surfaces; for example, it may be forced to pass through containers, suitably of cylindrical form, containing silver pellet or films, or pellets or films of other material, suitably coated or plated with silver. The passage of the chlorinated brine over silver in this manner is continued until examination of the treated brine shows that the bromine content thereof has not been substantially completely removed. In passing over the silver, the bromine of the brine reacts therewith, forming silver bromide, approximately 20 grams of silver bromide being deposited on each square meter of superficial area of silver exposed, this being the equivalent of about 8.5 grams of bromine.

After one batch of silver has been exhausted, the chlorinated brine may be diverted to another similar container of silver pellets or silver films, in which the action is continued.

The silver pellets or films are washed in any suitable manner with a potassium bromide solution of 5 to 25% strength, the potassium bromide solution being preferably warmed to 100 to 150° F., such washing preferably taking place in the same container in which the brine was treated. After complete solution of the silver bromide deposit on the silver surfaces, the latter are again subjected to the action of chlorinated brine, the alternate brine treatment and washing being continued as long as desired, or to substantial exhaustion of the silver.

The potassium bromide solution is repeatedly used, preferably countercurrently, over two or three absorbus, until a considerable proportion (at least 3%) of silver bromide is dissolved therein.

The potassium bromide solution is electrolyzed in a suitable cell, silver being deposited at the cathode and bromine liberated at the anode. It is preferred that the silver or silver coated pellets or films upon which the bromide deposit was originally formed be employed as the cathode in electrolyzing the potassium bromide solution, as the dissolved silver is thereby again plated on the surfaces of the pellets or films and made available for reuse.

The silver pellets or films used as the cathode in electrolyzing potassium bromide solution containing dissolved silver bromine are removed, washed with water and again used for extracting the bromine from chlorinated brine. The bromine separated at the anode is removed and purified in any desired way. In place of silver surfaces or films I may employ mercury, preferably in the form of an amalgam, as copper amalgam.

It is readily apparent that other suitable solvents for the bromine may be substituted for the potassium bromide solution, thus solutions of sodium thiosulfate may be employed, the silver and bromine being subsequently separated by chemical precipitation or by any desired method.

I claim:

1. In a method of producing bromine from brine containing small quantities thereof, the steps of liberating the bromine therein and passing the brine over silver surfaces thereby forming silver bromide thereon.

2. The method of producing bromine from brines containing small quantities thereof comprising the steps of chlorinating the brine, passing the chlorinated brine over silver surfaces, thereby forming silver bromide thereupon, washing the silver surfaces with potassium bromide solution, thereby dissolving the silver bromide, and electrolyzing the resulting bromide solution.

3. The method of producing bromine from brines containing small quantities thereof which comprises chlorinating the brine, passing the chlorinated brine over silver surfaces, thereby forming silver bromide thereupon, washing the silver surfaces with potassium bromide solutions, thereby dissolving the silver bromide from said surfaces, and electrolyzing the resulting bromide solution, employing the washed silver surfaces as a cathode, thereby redepositing silver thereupon, and freeing bromine at the anode.

4. The method of producing bromine from brines containing small quantities thereof which comprises chlorinating the brine, passing the chlorinated brine over silver surfaces, thereby forming silver bromide thereupon, washing the silver surfaces with a solvent liquid, and removing the silver and bromine from the solvent liquid.

5. In the method of producing bromine from brines containing small quantities thereof, the steps of chlorinating the brine, and passing the chlorinated brine over silver surfaces, thereby forming silver bromide thereupon.

ROBERT E. WILSON.